United States Patent
Chen (10) Patent No.: US 9,723,448 B2
(45) Date of Patent: Aug. 1, 2017

(54) TRACKING DEVICE, BATTERY CHARGER, AND TRACKING METHOD THEREOF

(71) Applicant: AthenTek Inc., Taipei (TW)

(72) Inventor: Chun-Nan Chen, Taipei (TW)

(73) Assignee: AthenTek Incorporated, Taipei (TW)

( * ) Notice: Subject to any disclaimer, the term of this patent is extended or adjusted under 35 U.S.C. 154(b) by 6 days.

(21) Appl. No.: 14/676,752

(22) Filed: Apr. 1, 2015

(65) Prior Publication Data

US 2016/0295369 A1    Oct. 6, 2016

(51) Int. Cl.
| | |
|---|---|
| *H04B 1/38* | (2015.01) |
| *H04W 24/00* | (2009.01) |
| *H04W 4/02* | (2009.01) |
| *H02J 7/00* | (2006.01) |
| *G01S 5/02* | (2010.01) |
| *G01S 19/42* | (2010.01) |
| *G01S 5/00* | (2006.01) |

(52) U.S. Cl.
CPC ........... *H04W 4/025* (2013.01); *G01S 5/0027* (2013.01); *G01S 5/0252* (2013.01); *G01S 5/0294* (2013.01); *G01S 19/42* (2013.01); *H02J 7/00* (2013.01); *H02J 7/0029* (2013.01); *H02J 2007/0001* (2013.01); *H02J 2007/0096* (2013.01)

(58) Field of Classification Search
None
See application file for complete search history.

(56) References Cited

U.S. PATENT DOCUMENTS

| | | | |
|---|---|---|---|
| 2004/0087307 A1* | 5/2004 | Ibe | H04W 36/14 455/436 |
| 2007/0176771 A1* | 8/2007 | Doyle | G08B 13/1427 340/539.13 |
| 2009/0292918 A1* | 11/2009 | Mori | G06F 21/31 713/168 |
| 2011/0136530 A1* | 6/2011 | Deshpande | H04W 24/10 455/515 |

* cited by examiner

*Primary Examiner* — Moustapha Diaby (57) ABSTRACT

A tracking device, a battery charger, and a tracking method thereof are provided. The method, adopted by a tracking device, includes: upon being attached to a battery charger, scanning, by the tracking device, for a first radio environment; and transmitting, by the tracking device, a request for setting the scanned first radio environment as a home zone to a monitoring device.

14 Claims, 6 Drawing Sheets

TRACKING DEVICE, BATTERY CHARGER, AND TRACKING METHOD THEREOF

BACKGROUND OF THE INVENTION

Field of the Invention

The present invention relates to location tracking, and in particular to a tracking device, a battery charger, and a tracking method thereof.

Description of the Related Art

Mobile devices nowadays can determine their locations by a radio signal source composition, navigation signals from a satellite system (e.g., global positioning system or GPS), or an assistant navigation system (e.g., Assistant GPS or AGPS) and then connect to a remote cloud-based server to provide location-based services (LBS) based on the location. LBS include services to identify a location of a person or object, such as tracking friends' or children's locations based on their current location.

Therefore, a tracking device and a tracking method thereof are required to track down the whereabouts of the tracking device.

BRIEF SUMMARY OF THE INVENTION

A detailed description is given in the following embodiments with reference to the accompanying drawings.

An embodiment of a method is described, adopted by a tracking device, comprising: upon being attached to a battery charger, scanning, by the tracking device, for a first radio environment; and transmitting, by the tracking device, a request for setting the scanned first radio environment as a home zone to a monitoring device.

Another embodiment of a tracking device is provided, comprising a scanning circuit and a transceiver. Upon being attached to a battery charger, the scanning circuit is configured to scan for a first radio environment. The transceiver is configured to transmit a request for setting the scanned first radio environment as a home zone to a monitoring device.

Another embodiment of a battery charger is disclosed, comprising a authorization code generation circuit and a battery control circuit. The authorization code generation circuit is configured to generate an authorization code. The battery control circuit, coupled to the authorization code generation circuit, is configured to transmit the authorization code to a tracking device when a tracking device is attached.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Various aspects are described herein in connection with a tracking device, which can also be referred to as a wireless communication device, a mobile device, a mobile station, a system, a device, a wireless terminal, a subscriber unit, a subscriber station, a mobile, a remote station, a remote terminal, an access terminal, a user terminal, a terminal, a communication device, a wireless device, a portable communication device, a user agent, a user device, or user equipment (UE). The mobile device may be a cellular telephone, a smartphone, a pager, a media player, a gaming console, a Session Initiation Protocol (SIP) phone, Personal Digital Assistant (PDA), a tablet computer, a laptop computer, a handheld device having wireless connection capability, a computing device, or any processing device connected to a wireless modem.

Further, various embodiments described herein are associated with a monitoring device, which may be a fixed or mobile communication device, e.g., a personal computer, a server computer, a smartphone, a tablet computer, a laptop computer, or any data processing device connected to a wireless modem. In addition, a battery charger described herein may be a simple charger, an inductive charger, a USB-based charger, and other types of power chargers. A signal source described herein is a wireless transmitter, including but not limited to, a Bluetooth device, a Wireless Fidelity (WiFi) Access Point (AP), a cellular base station, or a navigation satellite.

Figure 1:
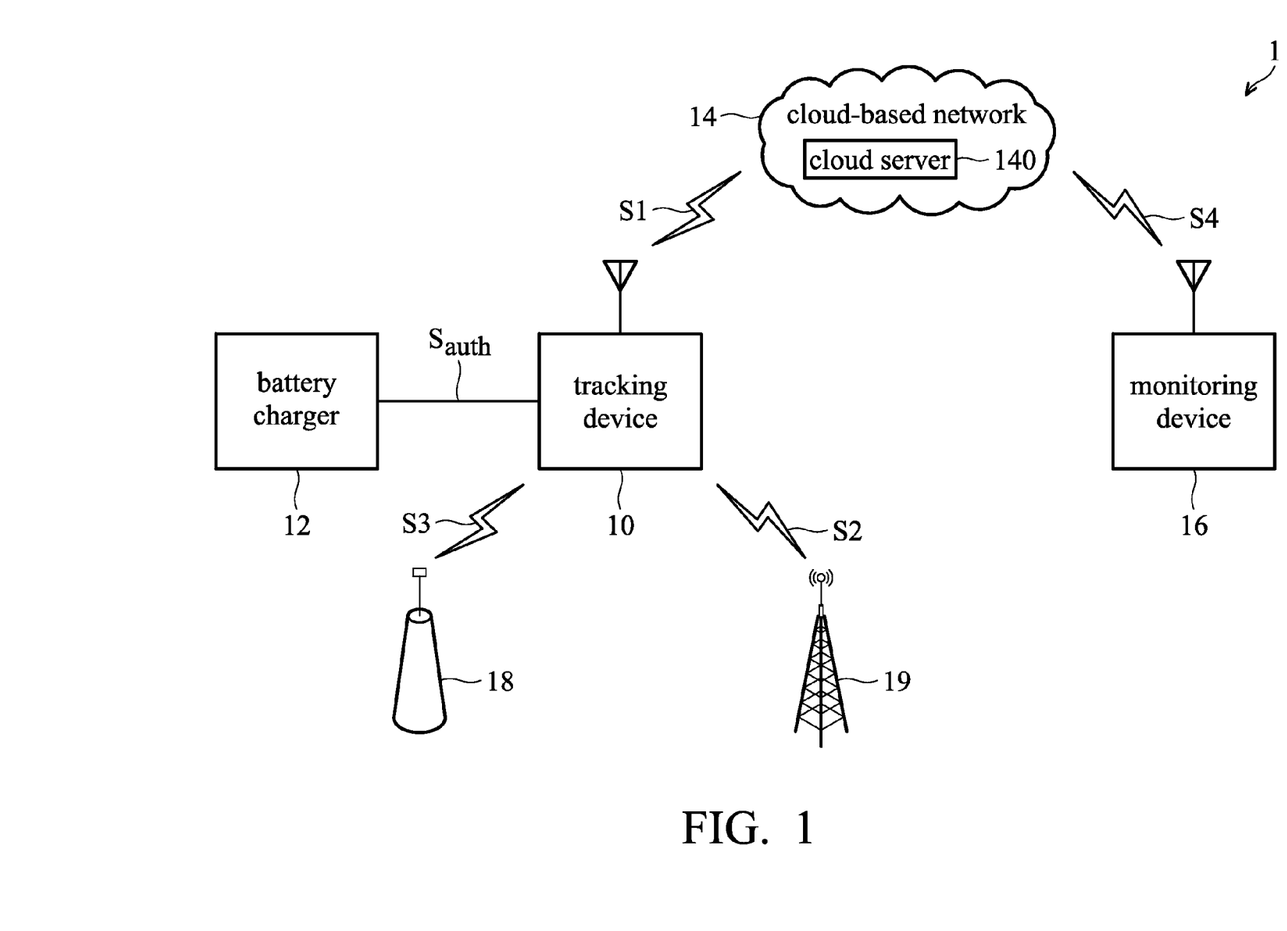
FIG. 1 is a schematic diagram of a tracking system 1 according to an embodiment of the invention.

FIG. 1 is a schematic diagram of a tracking system 1 according to an embodiment of the invention, including a tracking device 10, a battery charger 12, a cloud-based network 14, a monitoring device 16, a WiFi Access Point (AP) 18, and a base station 19. The cloud-based network 14 contains a cloud server 140 which performs tracking operations for a registered tracking device, e.g., the tracking device 10.

The location of the tracking device 10 may be tracked by the cloud-based network 14 and reported to the monitoring device 16. The tracking device 10 may be connected to the battery charger 12 to be recharged. The tracking device 10 may identify its location by the radio environment, which includes the WiFi Access Point (AP) 18 and the base station 19. Upon being attached to the battery charger 12, the tracking device 10 may be regarded as returning or entering into a home zone, which is a reference location known to users of the tracking device 10 and/or the monitoring device 16, and the monitoring device 16 is informed that the tracking device 10 has been returning or entering into the home zone. Conversely, when the tracking device 10 is detached from the battery charger 12 and moves away from the home zone, the tracking device 10 may once again identify its new location by the radio environment, and the monitoring device 16 may be informed that the tracking device 10 has left from a home zone or entered into a new home zone based on the newly acquired information about the radio environment. The radio environment includes information such as an identifier, an address, and signal strength of each detected signal source. The battery charger 12 may be a wired charger or a wireless charger, and the tracking device 10 may be attached to the battery charger 12 through a wired connection or a wireless connection.

Users may set the location of the battery charger 12 as a home zone. The battery charger 12 may be an authorized charger or an unauthorized charger. When the battery charger 12 is an authorized charger, an authorization code may be generated by the battery charger 12 and transmitted from the battery charger 12 to the tracking device 10 upon attachment. In turn, the tracking device 10 may determine whether the battery charger 12 is an authorized battery charger based on the authorization code. The authorization code is a data pattern sequence for identifying the battery charger 12. When the battery charger 12 is determined as an authorized battery charger, the tracking device 10 may scan the radio environment thereof, upload the scanned radio environment to the cloud-based network 14, and transmit a request for setting the scanned radio environment as a home zone to the monitoring device 16. Conversely, when the battery charger 12 is determined as an unauthorized battery charger, the tracking device 10 may start scanning the radio environment without uploading the scanned radio environment to the cloud-based network 14. The scanned radio environment may be used by the tracking device 10 to determine its current position.

In some embodiments, the tracking device 10 may scan the radio environment and send a home zone request to the monitoring device 16 even when the battery charger 12 is an unauthorized charger. In response to the home zone request, the monitoring device 16 may return a confirmation message or a rejection message to the tracking device 10. If a confirmation message is received, the tracking device 10 may set the scanned radio environment as a home zone; whereas if a rejection message is received, the tracking device 10 may not set up any new home zone. The monitoring device 16 may upload an updated list of home zones to the cloud-based network 14.

In some embodiments, once the scanned radio environment from the tracking device 10 is received, the cloud-based network 14 may send a home zone request to the monitoring device 16. In response to the home zone request, the monitoring device 16 may return a confirmation message or a rejection message to the cloud-based network 14. If a confirmation message is received, the cloud-based network 14 may set the scanned radio environment as a home zone; whereas if a rejection message is received, the cloud-based network 14 may not set up any new home zone. The cloud-based network 14 may inform the tracking device 10 that the new home zone is set.

In some embodiments, when no confirmation message or rejection message is received from the monitoring device 16, the tracking device 10 and the cloud-based network 14 may still set the scanned radio environment.

The tracking device 10 may scan for the radio environment when it moves out of the home zone, and transmit the newly scanned radio environment to the cloud-based network 14. In some embodiments, the tracking device 10 may compare the scanned radio environment to a list of home zones, which may be stored in a local memory device in the tracking device 10. When no match is found from the list of home zones, the tracking device 10 may determine that it has left a home zone and transmit a first indication message which indicates the tracking device 10 has left the home zone to the cloud-based network 14 and/or the monitoring device 16. When a match is found from the list of home zones, the tracking device 10 may determine that it has entered a home zone and transmit a second indication message which indicates the tracking device 10 has entered the home zone to the cloud-based network 14 and/or the monitoring device 16.

In other embodiments, the cloud-based network 14 may send compare the scanned radio environment to a list of home zones, which may be stored in a local memory device of the cloud server 140. When no match is found from the list of home zones, the cloud server 140 may determine that it has left a home zone and transmit a first indication message which indicates the tracking device 10 has left the home zone to the monitoring device 16. When a match is found from the list of home zones, the cloud server 140 may determine that it has entered a home zone and transmit a second indication message which indicates the tracking device 10 has entered the home zone to the monitoring device 16.

The tracking system 1 defines a reference location or a home zone by the locations of battery chargers, so that users may track down the whereabouts of the tracking device later, providing an intelligent tracking system for tracing a person, a pet, or an object.

Figure 2:
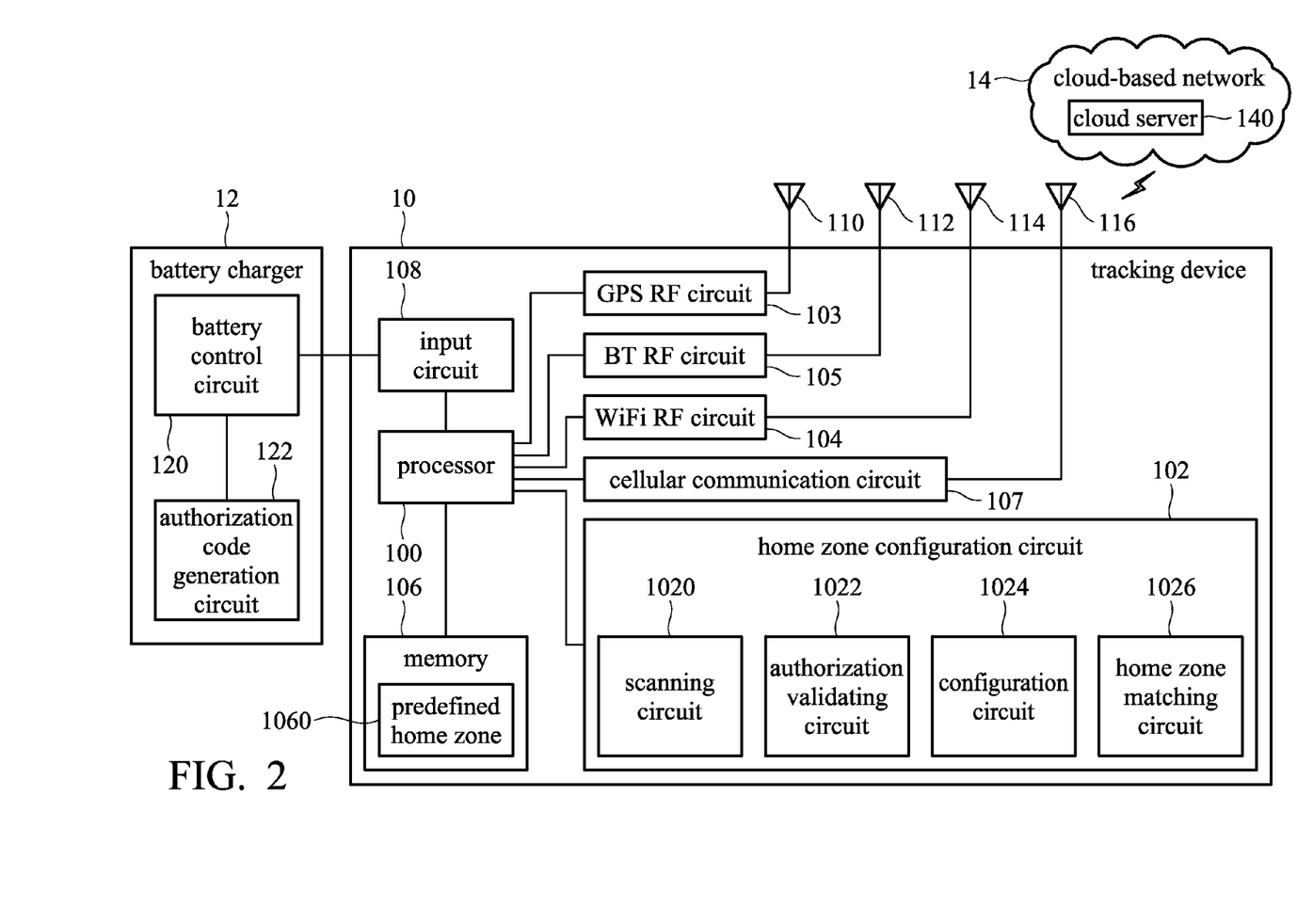
FIG. 2 shows block diagrams of the tracking device 10 and the battery charger 12 according to an embodiment of the invention.

FIG. 2 shows block diagrams of the tracking device 10 and the battery charger 12 according to an embodiment of the invention, incorporated in the tracking system 1 in FIG. 1. The tracking device 10 includes a processor 100, a home zone configuration circuit 102, a GPS RF circuit 103, a WiFi RF circuit 104, a Bluetooth (BT) RF circuit 104, a cellular communication circuit 107, a memory 106, an input circuit 108, and antennas 110, 112, 114, and 116. The battery charger 12 includes a battery control circuit 120 and an authorization code generation circuit 122.

For the battery charger 12, the authorization code generation circuit 122 is configured to generate an authorization code after the tracking device 10 is attached, and the battery control circuit 120 is configured to transmit the authorization code to the tracking device 10.

In the tracking device 10, the processor 100 may control operations of the home zone configuration circuit 102, the GPS RF circuit 103, the WiFi RF circuit 104, the BT RF circuit 104, the cellular communication circuit 107, the memory 106, and the input circuit 108. The input circuit 108 may be connected to the battery charger 12 and configured to receive the authorization code from the battery charger 12. The home zone configuration circuit 102 may be configured to validate the authorization code, scan for the radio environment, set up a home zone, and match for a home zone. The memory 106 may be configured to store the home zone.

The home zone configuration circuit 102 contains a scanning circuit 1020, an authorization validating circuit 1022, a configuration circuit 1024, and a home zone matching circuit 1026. The authorization validating circuit 1022 is configured to validate the authorization code from the battery charger 12 by comparing the authorization code with a known authorization pattern, which may be stored in the memory 106, or by applying error detection to the authorization code. The scanning circuit 1020 is configured to receive the validation result of the authorization code from the authorization validating circuit 1022. When the validation result of the authorization code indicates that the battery charger 12 is an authorized charger, the scanning circuit 1020 may be configured to scan the radio environment thereof, upload the scanned radio environment to the cloud-based network 14, and transmit a request for setting the scanned radio environment as a home zone to the monitoring device 16, otherwise, the validation result of the authorization code indicates that the battery charger 12 is an unauthorized charger, the tracking device 10 may be configured to start scanning the radio environment without uploading the scanned radio environment to the cloud-based network 14. The scanned radio environment may be used by the tracking device 10 to determine its current position. The configuration circuit 1024 is configured to set the scanned radio environment as a home zone 1060 in the memory 106 when the cellular communication circuit 107 receives a confirmation message from the monitoring device 16, and do not set any new home zone when the cellular communication circuit 107 receives a rejection message from the monitoring device 16. The home zone matching circuit 1026 is configured to match the scanned radio environment to the home zone 1060 in the memory 106, which has been defined previously.

In some embodiments, the scanning circuit 1020, the authorization validating circuit 1022, the configuration circuit 1024, and the home zone matching circuit 1026 are implemented by software codes executable by the processor 100 and stored in the memory 106. Upon power up, the processor 100 may load the codes of the scanning circuit 1020, the authorization validating circuit 1022, the configuration circuit 1024, and the home zone matching circuit 1026 and perform the operations described above.

Each of the WiFi RF circuit 104, the BT RF circuit 104, and the cellular communication circuit 107 includes a transmitter circuit for transmitting and a receiver circuit for receiving the respective signals via the respective WiFi antenna 112, BT antenna 114, and cellular antenna 116. The GPS RF circuit 103 includes a receiver circuit for receiving GPS signals via the GPS antenna 110. The GPS RF circuit 103, WiFi RF circuit 104, the BT RF circuit 104, and the cellular communication circuit 107 may operate concurrently, sequentially, or independently. The signal strength such as Carrier to Noise Ratio (CNR) or Received Signal Strength Indicator (RSSI) may be measured and computed by computation circuits (not shown) in the GPS RF circuit 103, the WiFi RF circuit 104, the BT RF circuit 104 and the cellular communication circuit 107. The cellular communication circuit 107 may be configured to communicate with the cloud-based network 4, and/or a radio access network and/or local area network, and/or point-to-point connection, including Global System for Mobile Communications (GSM), General packet radio service (GPRS), Enhanced Data rates for GSM Evolution (EDGE), Universal Mobile Telecommunications System (UMTS), Code Division Multiple Access 2000 (CDMA2000), Enhanced Voice-Data Optimized (EVDO), High Speed Packet Access (HSPA), HSPA plus (GSPA+), Time Division-Synchronous Code Division Multiple Access (TD-SCDMA), Worldwide Interoperability for Microwave Access (WiMAX), Long Term Evolution (LTE), and LTE-Advanced (LTE-A) systems.

The tracking device 10 defines a reference location or a home zone by the location of battery charger 12, so that users may track down the whereabouts of the tracking device later, providing an intelligent tracking device for tracing a person, a pet, or an object.

Figure 3:
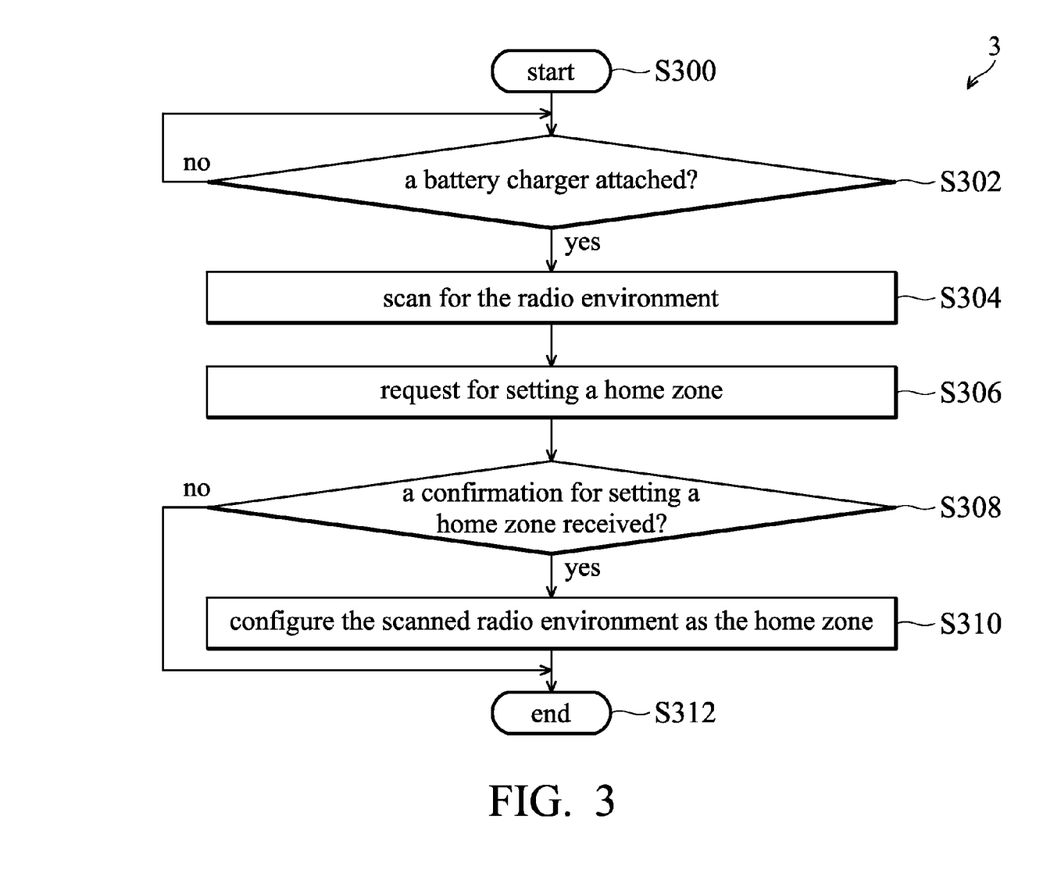
FIG. 3 is a flowchart of a home zone configuration method 3 according to an embodiment of the invention.

FIG. 3 is a flowchart of a home zone configuration method 3 according to an embodiment of the invention, incorporating the tracking device 10 in FIGS. 1 and 2. The home zone configuration method 3 is used to set up a home zone for the tracking device 10.

The home zone configuration method 3 may be initiated upon power up (S300), the tracking device 10 determines whether it is attached to a battery charger (S302). If so, the tracking device 10 scans for the radio environment (S304), otherwise, the home zone configuration method 3 returns to Step S302 to detect an attachment periodically, e.g., every 5 seconds. The radio environment may include information of detected radio sources, such as an identifier, an address, and signal strength. The battery charger may be a wired charger or a wireless charger, and the tracking device 10 may be attached to the battery charger through a wired connection or a wireless connection. The tracking device 10 then uploads the scanned radio environment may to the cloud-based network 14 and sends a home zone request for setting up a home zone to the monitoring device 16 (S306). In response to the home zone request, the tracking device 10 may receive a confirmation message from the monitoring device 16 (S308). If a rejection message is received, the home zone configuration method 3 is stopped and exited (S312). If a confirmation message is received, the tracking device 10 may configure the scanned radio environment as the home zone (S310), store the home zone configuration in the local memory, and/or upload the home zone configuration to the cloud-based network 14. The home zone configuration method 3 is then completed and exited (S312).

In some embodiments, Step S308 may be omitted from the home zone configuration method 3, i.e., the tracking device 10 may configure the scanned radio environment as the home zone and upload the home zone configuration to the cloud-based network 14 after uploading the scanned radio environment to the cloud-based network 14.

Figure 4:
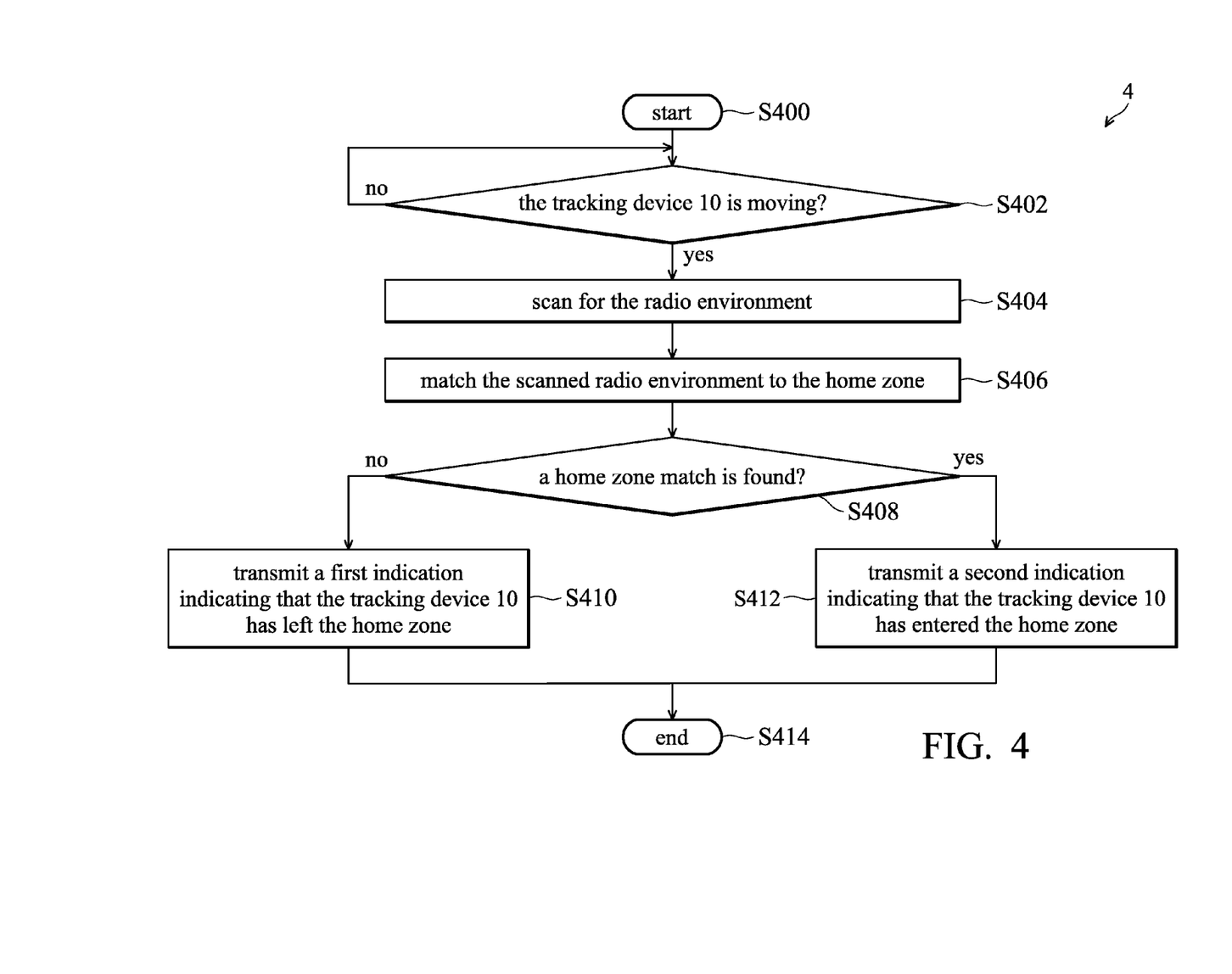
FIG. 4 is a flowchart of a tracking method 4 according to an embodiment of the invention.

FIG. 4 is a flowchart of a tracking method 4 according to an embodiment of the invention, incorporating the tracking device 10 in FIGS. 1 and 2. The tracking method 4 is used to track the tracking device 10, and may be used in conjunction with the home zone configuration method 3.

The tracking method 4 may be initiated upon power up (S400). Upon startup, the tracking device 10 determines whether it is moved (S402). The move of the tracking device 10 may be detected by determining whether tracking device 10 is detached from the battery charger, whether the surrounding radio environment has changed, or whether a built-in gravity sensor (not shown) has detected a motion. If tracking device 10 is moved, the tracking device 10 scans for the radio environment (S404), otherwise, the tracking method 4 returns to Step S402 to detect a move of the tracking device 10 periodically, e.g., every 3 seconds. The tracking device 10 may upload the scanned radio environment to the cloud-based network 14. The tracking device 10 then matches the scanned radio environment to the home zone configuration stored in the local memory (S406), and determines whether a match is found (S408). If the scanned radio environment is found in the home zone configuration, the tracking device 10 may transmit a second indication indicating that the tracking device 10 has entered the home zone to the monitoring device 16 (S412). On the other hand, if no match is found, the tracking device 10 may transmit a first indication indicating that the tracking device 10 has left the home zone to the monitoring device (S410). In some embodiments, Steps S408, S410, and S412 are performed in the cloud server 140 of the cloud-based network 14 using the radio environment received from the tracking device 10. The tracking method 4 is then completed and exited (S312).

Figure 5:
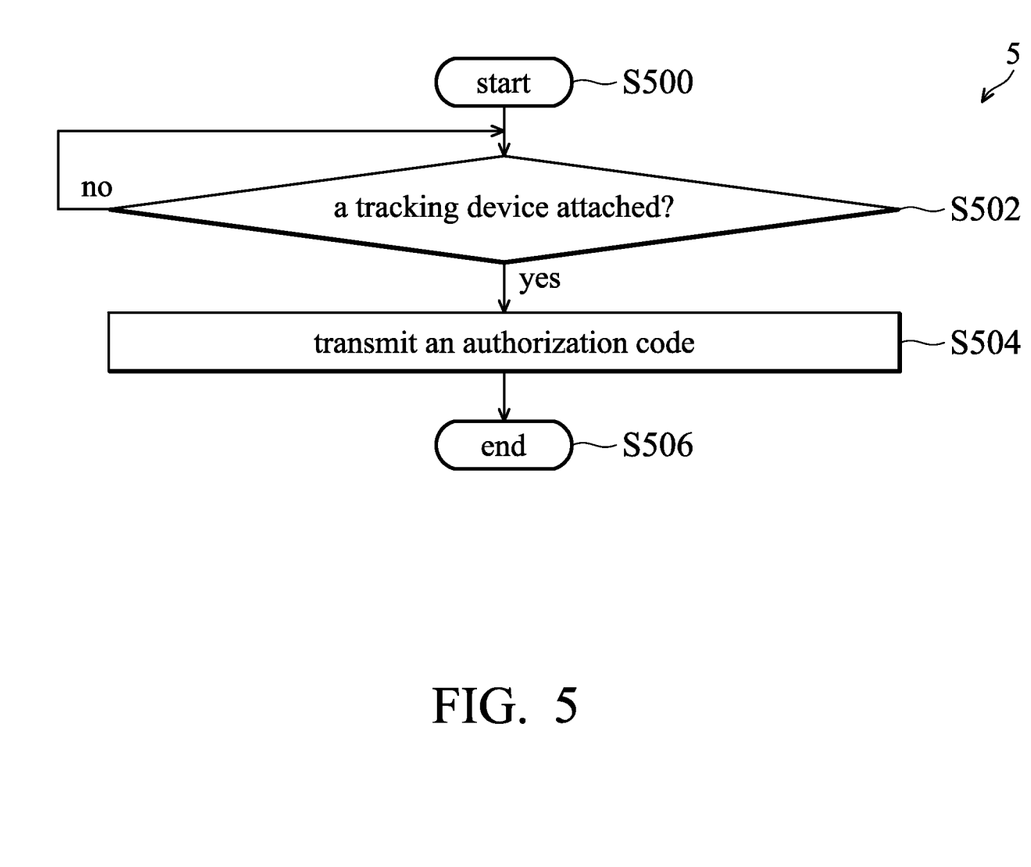
FIG. 5 is a flowchart of an authorization method 5 adopted by the battery charger 12 according to an embodiment of the invention.

FIG. 5 is a flowchart of an authorization method 5 adopted by the battery charger 12 according to an embodiment of the invention, incorporating the battery charger 12 in FIGS. 1 and 2. The battery charger 12 may be a wired charger or a wireless charger, and a tracking device may be attached to the battery charger 12 through a wired connection or a wireless connection. The authorization method 5 is used to identify an authorized battery charger.

The authorization method 5 may be initiated upon power up (S500). Upon startup, the battery charger 12 determines whether a tracking device is attached (S502). If so, the battery charger 12 then generates and transmits an authorization code to the tracking device (S504), otherwise, the authorization method 5 returns to Step S502 to continue determining whether a tracking device is attached. The authorization code is a data pattern which may be fixed or runtime generated according to a rule known by the tracking device. The authorization method 5 is then completed and exited (S506).

Figure 6:
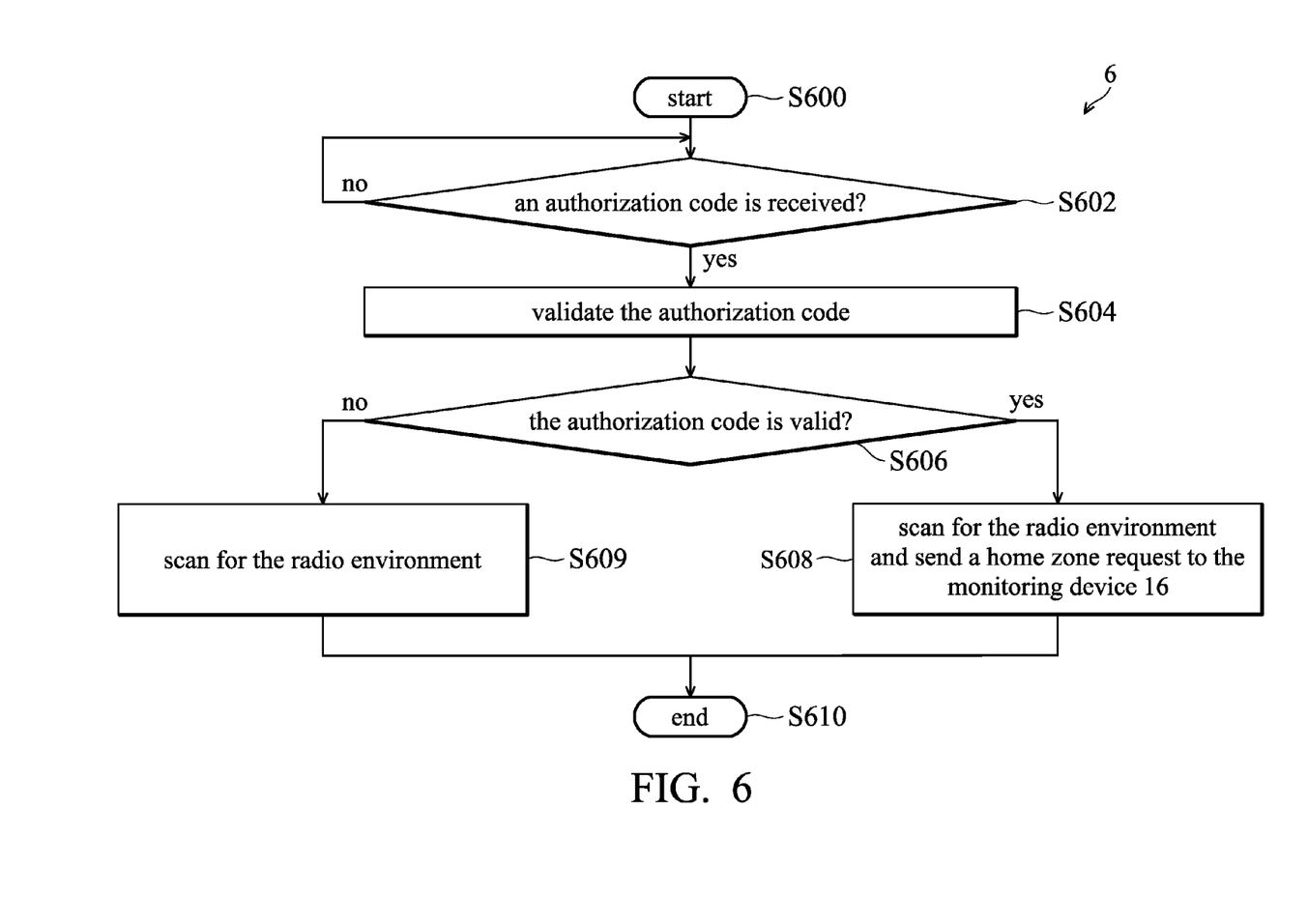
FIG. 6 is a flowchart of an authorization method 6 adopted by the tracking device 10 according to an embodiment of the invention.

FIG. 6 is a flowchart of an authorization method 6 adopted by the tracking device 10 according to an embodiment of the invention, incorporating the tracking device 10 in FIGS. 1 and 2. The authorization method 6 is used to identify an authorized battery charger, and may be used in conjunction with the authorization method 5 and the home zone configuration method 3.

The authorization method 6 may be initiated upon power up (S600). Upon startup, the tracking device 10 determines whether an authorization code is received from a battery charger (S602). If not, authorization method 6 returns to Step S602. If so, the tracking device 10 then validates the authorization code (S604) and determines whether the authorization code is valid. If the authorization code is invalid, the tracking device 10 may scan for the radio environment without uploading the scanned radio environment to the cloud-based network 14 (S609), and the authorization method 3 is then completed and exited (S610). If the authorization code is valid, the tracking device 10 may scan for the radio environment and send a home zone request for setting a home zone to the monitoring device 16 (S608), and the authorization method 3 is then completed and exited (S610).

The methods 3 through 6 define a reference location or a home zone by the locations of battery chargers, so that users may track down the whereabouts of the tracking device later, providing intelligent tracking methods for tracing a person, a pet, or an object.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application-specific integrated circuit (ASIC), a field programmable gate array signal (FPGA) or another programmable logic device, discrete gate or transistor logic, discrete hardware components or any combination thereof designed to perform the functions described herein. A general-purpose processor may be a microprocessor, but in the alternative, the processor may be any commercially available processor, controller, microcontroller or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method, adopted by a tracking device, comprising:
   upon being attached to a battery charger, scanning, by the tracking device, for a first radio environment and receiving, by the tracking device, an authorization code from the battery charger;
   determining, by the tracking device, whether the battery charger is an authorized battery charger based on the authorization code; and
   when the battery charger is an authorized battery charger, transmitting, by the tracking device, a request for setting the scanned first radio environment as a home zone to a monitoring device.

2. The method of claim 1, further comprising:
   transmitting, by the tracking device, a home zone request to the monitoring device when the battery charger is not the authorized battery charger;
   receiving a confirmation message or a rejection message in response to the home zone request; and
   setting the scanned first radio environment as the home zone only if the confirmation message is received.

3. The method of claim 1, further comprising:
   receiving a confirmation for setting the scanned first radio environment as the home zone from the monitoring device; and
   setting the scanned first radio environment as the home zone;
   when the tracking device has left the home zone, transmitting a first indication which indicates the tracking device has left the home zone to the monitoring device.

4. The method of claim 3, further comprising:
   transmitting, by the tracking device, the scanned first radio environment as the home zone to a remote server;
   wherein the step of transmitting the first indication comprises: when the tracking device has left the home zone, transmitting, by the remote server, the first indication which indicates the tracking device has left the home zone to the monitoring device.

5. The method of claim 1, further comprising:
   determining, by the tracking device, a move of the tracking device;
   scanning, by the tracking device, for a second radio environment after determining the move of the tracking device;
   matching the scanned second radio environment to the home zone; and
   when the scanned second radio environment fails to match the home zone, determining that the tracking device has left the home zone.

6. The method of claim 5, further comprising:
   when the second radio environment matches the home zone, transmitting a second indication which indicates that the tracking device has entered the home zone to the monitoring device.

7. The method of claim 1, wherein the first radio environment comprises a radio source and an identifier, an address, and signal strength of the radio source.

8. A tracking device, comprising:
an input circuit, configured to receive an authorization code from a battery charger upon being attached to the battery charger;
an authorization validating circuit, configured to determine whether the battery charger is an authorized battery charger based on the authorization code,
a scanning circuit, upon being attached to the battery charger, configured to scan for a first radio environment when the battery charger is an authorized battery charger; and
a transceiver, configured to transmit a request for setting the scanned first radio environment as a home zone to a monitoring device.

9. The tracking device of claim 8, further comprises:
the transceiver transmits a home zone request to the monitoring device when the battery charger is not the authorized battery charger;
the transceiver receives a confirmation message or a rejection message in response to the home zone request, wherein the tracking device sets the scanned first radio environment as the home zone only if the confirmation message is received.

10. The tracking device of 8, wherein:
the transceiver is configured to receive a confirmation for setting the scanned first radio environment as the home zone from the monitoring device;
the tracking device further comprises a configuration circuit, configured to set the scanned first radio environment as the home zone when the confirmation is received; and
when the tracking device has left the home zone, the transceiver is configured to transmit a first indication which indicates the tracking device has left the home zone to the monitoring device.

11. The tracking device of claim 8, wherein:
the scanning circuit is configured to scan for a second radio environment after a move of the tracking device;
the tracking device further comprises a home zone matching circuit, configured to match the scanned second radio environment to the home zone, and when the scanned second radio environment fails to match the home zone, determine that the tracking device has left the home zone.

12. The tracking device of claim 11, wherein:
when the second radio environment matches the home zone, the transceiver is configured to transmit a second indication which indicates that the tracking device has entered the home zone to the monitoring device.

13. The tracking device of claim 8, wherein the transceiver is configured to transmit the scanned first radio environment as the home zone to a remote server.

14. The tracking device of claim 8, wherein the first radio environment comprises a radio source and an identifier, an address, and signal strength of the radio source.

* * * * *